United States Patent
Byun

(10) Patent No.: US 9,916,088 B2
(45) Date of Patent: Mar. 13, 2018

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 299 days.

(21) Appl. No.: 14/682,901

(22) Filed: Apr. 9, 2015

(65) Prior Publication Data
US 2016/0179385 A1 Jun. 23, 2016

(30) Foreign Application Priority Data
Dec. 19, 2014 (KR) .................. 10-2014-0184811

(51) Int. Cl.
G06F 3/06 (2006.01)
(52) U.S. Cl.
CPC .......... G06F 3/0604 (2013.01); G06F 3/0644 (2013.01); G06F 3/0673 (2013.01)
(58) Field of Classification Search
CPC ..... G06F 3/0604; G06F 3/0644; G06F 3/0673
USPC ............... 711/154, 103, 156; 365/185.33
See application file for complete search history.

(56) References Cited

U.S. PATENT DOCUMENTS

| | | | |
|---|---|---|---|
| 6,788,575 B2* | 9/2004 | Kozakai | G06F 11/1068 365/185.09 |
| 6,868,032 B2* | 3/2005 | Kozakai | G06F 11/1068 365/189.05 |
| 7,012,845 B2* | 3/2006 | Kozakai | G06F 11/1068 365/185.09 |
| 7,230,859 B2* | 6/2007 | Kozakai | G06F 11/1068 365/189.05 |
| 7,275,144 B2* | 9/2007 | Mukaida | G06F 12/0246 711/217 |
| 7,405,974 B2* | 7/2008 | Yaoi | G11C 7/10 257/324 |
| 8,174,888 B2* | 5/2012 | Lee | G11C 16/26 365/185.12 |
| 8,370,567 B1* | 2/2013 | Bonwick | G06F 3/0688 711/103 |
| 8,694,748 B2* | 4/2014 | Lau | G06F 12/0246 711/103 |

(Continued)

FOREIGN PATENT DOCUMENTS

| | | |
|---|---|---|
| KR | 1020090002812 | 1/2009 |
| KR | 1020100033855 | 3/2010 |

(Continued)

Primary Examiner — Stephen Elmore
(74) Attorney, Agent, or Firm — IP & T Group LLP

(57) ABSTRACT

A memory system includes a memory device including a plurality of memory blocks, wherein each of the plurality of memory blocks includes a plurality of pages, wherein each of the plurality of pages includes a plurality of memory cells electrically coupled to a plurality of word lines, wherein read data and write data requested from a host are stored in the plurality of memory cells; and a controller configured to (i) program first data corresponding to a write command/read command received from the host in a first page of a first memory block selected among the plurality of memory blocks (ii) record position information of second data in the first page, and (iii) program the second data in a second page next to the first page in the first memory block.

13 Claims, 11 Drawing Sheets

(56) References Cited

U.S. PATENT DOCUMENTS

| | | | | |
|---|---|---|---|---|
| 8,897,066 | B2* | 11/2014 | Jung | G11C 11/5628 365/185.02 |
| 9,606,911 | B2* | 3/2017 | Wang | G06F 12/0246 |
| 2011/0188057 | A1* | 8/2011 | Sakurai | G06K 15/02 358/1.2 |
| 2011/0289255 | A1* | 11/2011 | Wang | G06F 12/0246 711/1 |
| 2011/0320689 | A1* | 12/2011 | Cho | G06F 12/0246 711/103 |
| 2015/0095562 | A1* | 4/2015 | Lin | G06F 12/0246 711/103 |

FOREIGN PATENT DOCUMENTS

| | | |
|---|---|---|
| KR | 1020110094640 | 8/2011 |
| KR | 1020130128694 | 11/2013 |

* cited by examiner

MEMORY SYSTEM AND OPERATING METHOD THEREOF

CROSS-REFERENCE TO RELATED APPLICATION

This application claims priority under 35 U.S.C. § 119 to Korean Patent Application No. 10-2014-0184811 filed on Dec. 19, 2014, the disclosure of which is incorporated herein by reference in its entirety.

TECHNICAL FIELD

Exemplary embodiments of the present invention relate to a memory system, and more particularly, to a memory system which processes data from a memory device, and an operating method thereof.

DISCUSSION OF THE RELATED ART

Recently, the paradigm for the computing environment has changed to ubiquitous computing, so that computer systems can be used anytime and anywhere. Because of this, the use of portable electronic devices such as mobile phones, digital cameras, and notebook computers has rapidly increased. Such portable electronic devices generally use memory systems with memory devices, that is, data storage devices. Data storage devices are used as main memory or auxiliary memory devices within the portable electronic devices.

Data storage devices with memory devices are advantageous because, since there are no moving parts, stability and durability is excellent, information access speed is high, and power consumption is low. Examples of data storage devices having memory systems with these advantages include universal serial bus (USB) memory devices, memory cards having various interfaces, and solid state drives (SSD).

SUMMARY

Various embodiments are directed to a memory system and an operating method thereof that are capable of quickly and stably processing data from a memory device.

In an embodiment, a memory system may include: a memory device including a plurality of memory blocks, wherein each of the plurality of memory blocks includes a plurality of pages, wherein each of the plurality of pages includes a plurality of memory cells electrically coupled to a plurality of word lines, wherein read data and write data requested from a host are stored in the plurality of memory cells; and a controller configured to (i) program first data corresponding to a write command/read command received from the host in a first page of a first memory block selected among the plurality of memory blocks (ii) record position information of second data in the first page, and (iii) program the second data in a second page next to the first page in the first memory block.

The controller may program the first data in a data region of the first page and records the position information of the second data in a spare region of the first page.

The controller may record position information of third data in the second page and programs the third data in a third page next to the second page.

The second data may be not programmed successfully in the second page, the controller programs the second data in the second page using the position information of the second data recorded in the spare region of the first page.

When the third data does not exist, the controller may record dummy data or null data in a spare region of the second page.

When the first data and the second data are data which are stored in a buffer included in the controller, the position information of the second data may be an address of the second data which is stored in the buffer.

When the first data and the second data are data which are programmed in the first memory block, the position information of the second data may be an address of the second data which is programmed in the first memory block.

The position information of the second data may include information on the location where the second data is stored in the first memory block.

The position information of the second data may be a logical block address (LBA) of the second data.

In an embodiment, a method for operating a memory system includes a memory apparatus may include: selecting a first memory block among a plurality of memory blocks of the memory apparatus; selecting a first page among a plurality of pages included in the first memory block, wherein the first page includes a plurality of memory cells electrically coupled to a plurality of word lines; programming first data corresponding to a write command/read command received from a host in the first page of the first memory block; recording position information of second data in the first page of the first memory block; and programming the second data in a second page next to the first page in the first memory block.

The programming of the first data corresponding to the write command/read command received from the host in the first page may include programming the first data in a data region of the first page, and the recording of the position information of the second data may include recording the position information of the second data in a spare region of the first page.

The programming in the second page may further include: recording position information of third data in the second page, wherein the third data is programmed in a third page next to the second page.

The programming of the second data in the second page may further include: checking the position information of the second data recorded in the spare region of the first page when the programming of the second data in the second page fails; and programming the second data in the second page by using the position information of the second data.

The recording of the position information of third data in the second page may further include: recording dummy data or null data in a spare region of the second page when the third data which is programmed in the third page does not exist.

When the first data and the second data are data which are stored in a buffer included in a controller, the position information of the second data may be an address of the second data which is stored in the buffer.

When the first data and the second data are data which are programmed in the first memory block, the position information of the second data may be an address of the second data which is programmed in the first memory block.

The position information of the second data may include information on the location where the second data is stored in the second memory block.

The position information of the second data may be a logical block address (LBA) of the second data.

In an embodiment, a memory system may include: a memory block including N number of pages, $(M-1)^{th}$ page may include non-position information of $(M-1)^{th}$ data, $M^{th}$ page may include non-position information of $M^{th}$ data, the $(M-1)^{th}$ page further may include position information of the $M^{th}$ data, and N may be an integer, M may be an integer, and M≤N.

Each of the N number of pages may include a data region and a spare region, a data region of the $(M-1)^{th}$ page may store the non-position information of the $(M-1)^{th}$ data, a spare region of the $(M-1)^{th}$ page may store the position information of the $M^{th}$ data, and a spare region of the $N^{th}$ page may store null data.

DETAILED DESCRIPTION

Figure 1:
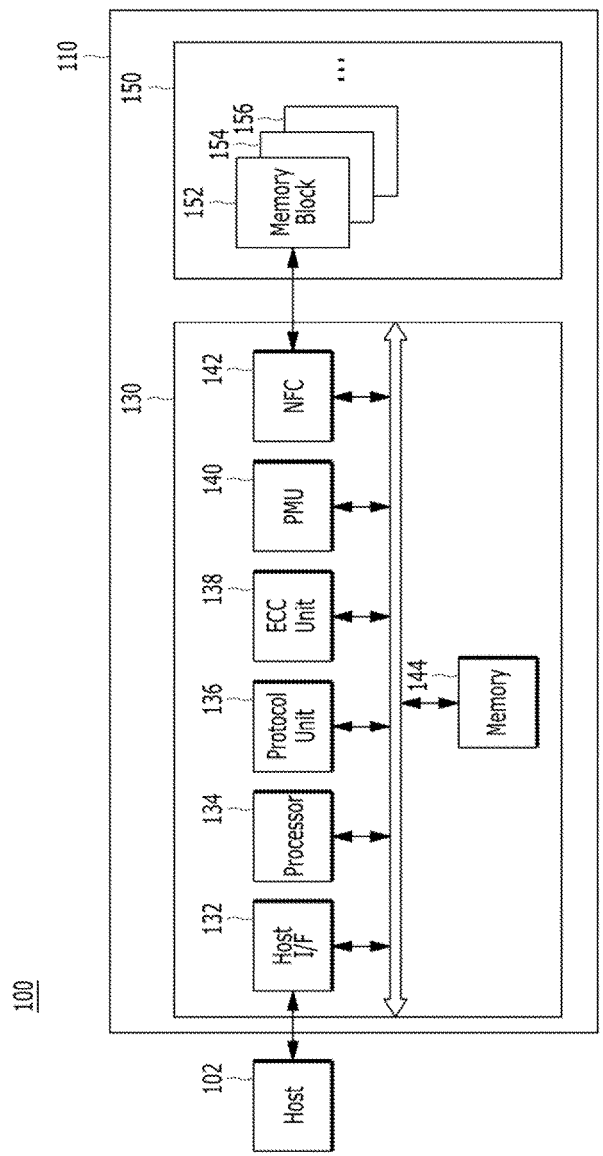
FIG. 1 is a diagram illustrating a data processing system including a memory system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a data processing system including a memory system in accordance with an embodiment of the present invention.

Referring to FIG. 1, the data processing system 100 may include a host 102 and a memory system 110.

The host 102 includes, for example, a portable electronic device such as a mobile phone, an MP3 player and a laptop computer or an electronic device such as a desktop computer, a game player, a TV and a projector.

The memory system 110 operates in response to a request from the host 102, and in particular, stores data to be accessed by the host 102. In other words, the memory system 110 may be used as a main memory device or an auxiliary memory device of the host 102. The memory system 110 may be implemented with any one of various kinds of storage devices, according to the protocol of a host interface to be electrically coupled with the host 102. For example, the memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices which realize the memory system 110 may be implemented with a volatile memory device such as a dynamic random access memory (DRAM) and a static random access memory (SRAM), or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetic RAM (MRAM) and a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as an SSD, the operation speed of the host 102, which is electrically coupled with the memory system 110 may be significantly increased.

The controller 130 and the memory device 150 may be integrated into one semiconductor device and configure a memory card. For example, the controller 130 and the memory card 150 may be integrated into one semiconductor device and configure a memory card such as a Personal Computer Memory Card International Association (PCM-CIA) card, a compact flash (CF) card, a smart media (SM) card, a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 includes a plurality of memory blocks 152, 154 and 156. Each of the memory blocks 152, 154 and 156 includes a plurality of pages. Each of the pages includes a plurality of memory cells to which a plurality of word lines (WL) are electrically coupled. The memory device 150 may be a nonvolatile memory device, for example, a flash memory. The flash memory may have a three-dimensional (3D) stack structure. Since the structure of the memory device 150 and the three-dimensional (3D) stack structure of the memory device 150 will be described later in detail with reference to FIGS. 2 to 11, detailed descriptions thereof will be omitted for now.

The controller 130 of the memory system 110 controls the memory device 150 in response to a request from the host 102. For example, the controller 130 provides the data read from the memory device 150, to the host 102, and stores the data provided from the host 102, in the memory device 150. To this end, the controller 130 controls overall operations of the memory device 150, such as read, write, program and erase operations.

In detail, the controller 130 includes a host interface unit 132, a processor 134, a protocol unit 136, an error correction code (ECC) unit 138, a power management unit 140, a NAND flash controller 142, and a memory 144.

The host interface unit 132 processes commands and data provided from the host 102, and may be configured to communicate with the host 102 through at least one of various interface protocols such as a universal serial bus (USB), a multimedia card (MMC), a peripheral component interconnect-express (PCI-E), a serial-attached SCSI (SAS), a serial advanced technology attachment (SATA), a parallel advanced technology attachment (PATA), a small computer system interface (SCSI), an enhanced small disk interface (ESDI), and an integrated drive electronics (IDE).

The ECC unit 138 detects and corrects an error included in the data read from the memory device 150 during the read operation. That is, after performing an error correction decoding operation on the data read from the memory device 150, the ECC unit 138 may determine whether the error correction decoding operation has succeeded, output an indication signal in response to a determination result, and correct an error bit of the read data based on a parity bit generated by an ECC encoding process. The ECC unit 138 may not correct error bits if the number of the error bits is equal to or greater than a threshold number of correctable error bits, and may output an error correction fail signal indicating that it is incapable of correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The protocol unit 136 stores and manages protocols for the controller 130 to control the memory device 150 in response to a request from the host 102. The PMU 140 provides and manages power for the controller 130, that is, power for the component elements included in the controller 130.

The NFC 142 serves as a memory interface between the controller 130 and the memory device 150 to allow the controller 130 to control the memory device 150 in response to a request from the host 102. The NFC 142 generates control signals for the memory device 150 and processes data under the control of the processor 134, when the memory device 150 is a flash memory and, in particular, when the memory device 150 is a NAND flash memory.

The memory 144 serves as a working memory of the memory system 110 and the controller 130, and stores data for driving the memory system 110 and the controller 130. In detail, when the controller 130 controls the memory device 150 in response to a request from the host 102, for example, when the controller 130 provides the data read from the memory device 150 to the host 102, and stores the data provided from the host 102 in the memory device 150, and, to this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be implemented with volatile memory. For example, the memory 144 may be implemented with a static random access memory (SRAM) or a dynamic random access memory (DRAM). As described above, the memory 144 stores data needed to perform the read and write operations between the host 102 and the memory device 150. To store the data, the memory 144 includes a program memory, a data memory, a write buffer, a read buffer, a map buffer, and so forth.

The processor 134 controls general operations of the memory system 110, and controls a write operation or a read operation for the memory device 150, in response to a write request or a read request from the host 102. The processor 134 drives firmware which is referred to as a flash translation layer (FTL), to control the general operations of the memory system 110. The processor 134 may be implemented with a microprocessor or a central processing unit (CPU).

A management unit (not shown) for performing "bad management," for example, bad block management, of the memory device 150 is included in the processor 134. The management unit checks the plurality of memory blocks included in the memory device 150, finds those that are bad (are in unsatisfactory condition for further use) and performs bad block management. When the memory device 150 is a flash memory, for example, a NAND flash memory, a program fail may occur during the write operation, for example, during the program operation, due to characteristics of a NAND logic function. "Bad management," that is, bad block management means processing memory blocks in which a program failure has occurred, as bad, and program the data that has failed to be programmed in a new memory block. Hereinbelow, the memory device in the memory system in accordance with an embodiment will be described in detail with reference to FIGS. 2 to 11.

Figure 2:
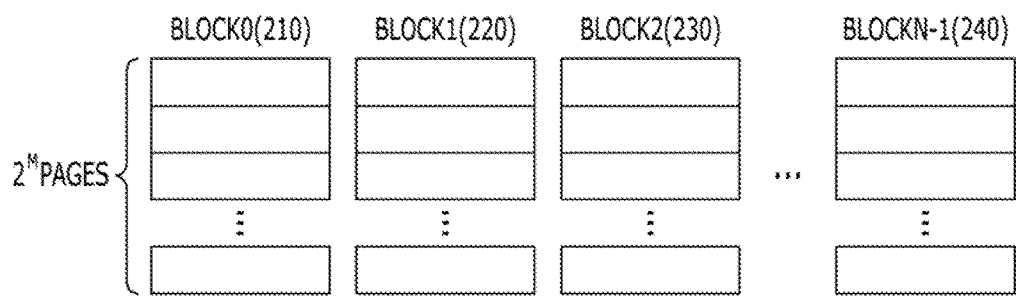
FIG. 2 is a diagram illustrating a memory device in the memory system shown in FIG. 1.

FIG. 2 is a diagram illustrating the memory device 150 in the memory system 110 shown in FIG. 1.

Referring to FIG. 2, the memory device 150 includes a plurality of memory blocks, for example, a zeroth block (BLOCK0) 210, a first block (BLOCK1) 220, a second block (BLOCK2) 230 and an N-1$^{th}$ block (BLOCKN−1) 240. Each of the blocks 210, 220, 230 and 240 includes a plurality of pages, for example, $2^M$ number of pages ($2^M$PAGES). While it is described for the sake of convenience in explanation that each of the plurality of memory blocks includes $2^M$ number of pages, it is to be noted that each of the plurality of memory blocks may include M number of pages. Each of the pages includes a plurality of memory cells to which a plurality of word lines (WL) are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block includes a plurality of pages which are implemented with memory cells each capable of storing 1-bit data, and may have high data calculation performance and superior durability. The MLC memory block includes a plurality of pages which are implemented with memory cells each capable of storing multi-bit data, for example, two or more-bit data, and may have a data storage space larger than the SLC memory block, that is, may be highly integrated. An MLC memory block including a plurality of pages which are implemented with memory cells that are each capable of storing 3-bit data may be defined as a triple level cell (TLC) memory block.

Each of the memory blocks 210, 220, 230 and 240 stores the data provided from the host device 102 of FIG. 1 during a write operation, and provides stored data to the host 102 during a read operation.

Figure 3:
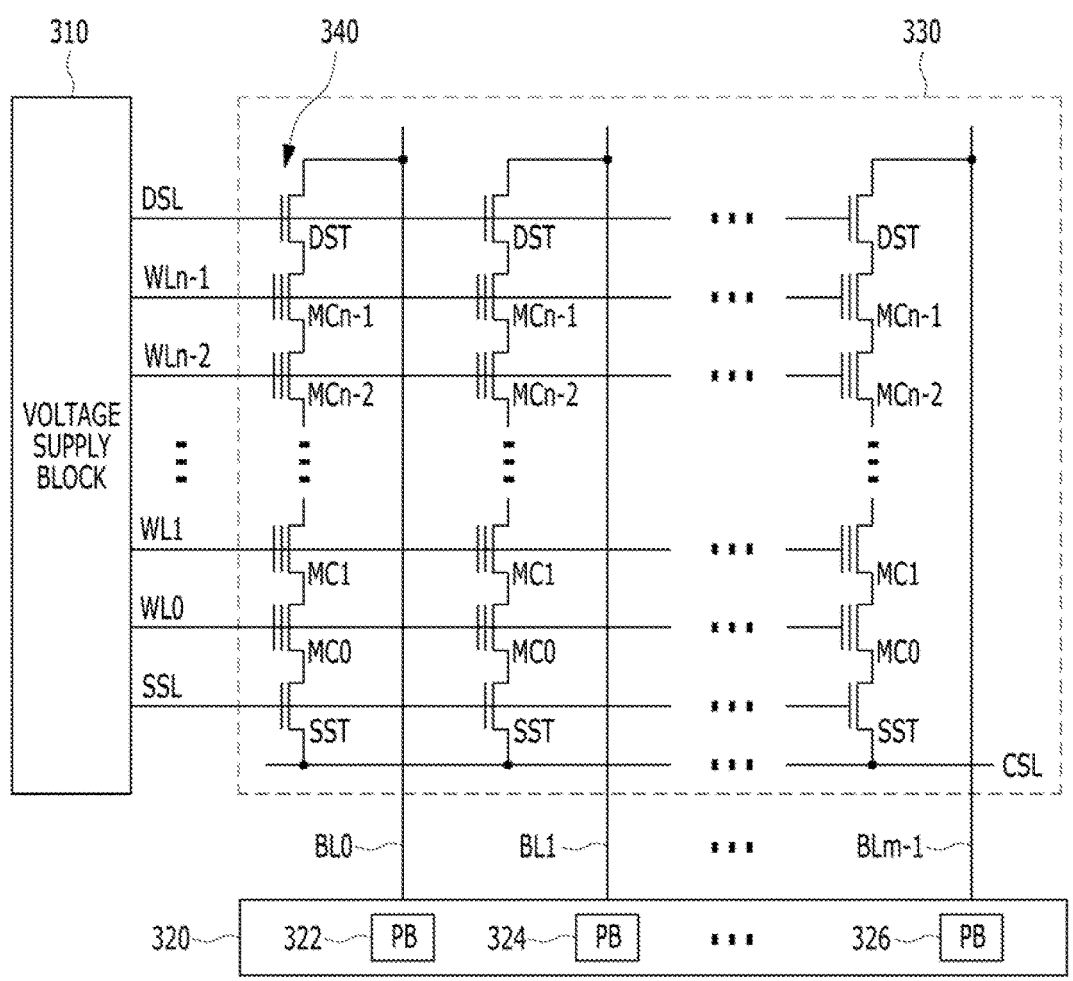
FIG. 3 is a circuit diagram illustrating a memory block in a memory device in accordance with an embodiment.

FIG. 3 is a circuit diagram illustrating a memory block in a memory device in accordance with an embodiment of the present invention.

Referring to FIG. 3, the memory block 330 of the memory device 300 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 330 which is configured by NAND flash memory cells, it is to be noted that the memory block 330 of the memory device 300 in accordance with the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 is controlled by the control circuit, and may serve as a sense amplifier or a write driver according to an operation mode. For example, during a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Hereinbelow, detailed descriptions will be made with reference to FIGS. 4 to 11, for the memory device 150 in the memory system in accordance with an embodiment, when the memory device is implemented with a three-dimensional (3D) nonvolatile memory device.

Figure 4:
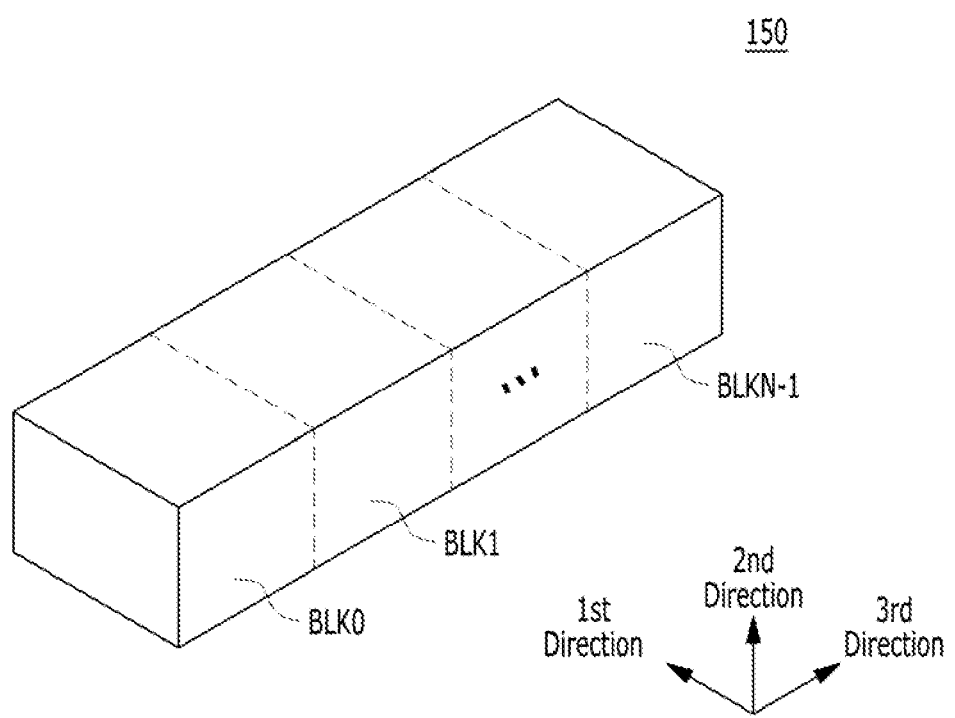
FIGS. 4 to 11 are diagrams schematically illustrating a memory device in a memory system in accordance with an embodiment.

FIG. 4 is a block diagram illustrating the memory block of the memory device 150 shown in FIG. 2.

Referring to FIG. 4, the memory device 150 may include a plurality of memory blocks BLK0 to BLKN−1, and each of the memory blocks BLK0 to BLKN−1 may be realized in a three-dimensional (3D) structure or a vertical structure. For example, the respective memory blocks BLK0 to BLKN−1 may include structures which extend in first to third directions, for example, an x-axis direction, a y-axis direction and a z-axis direction.

The respective memory blocks BLK0 to BLKN−1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, the respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
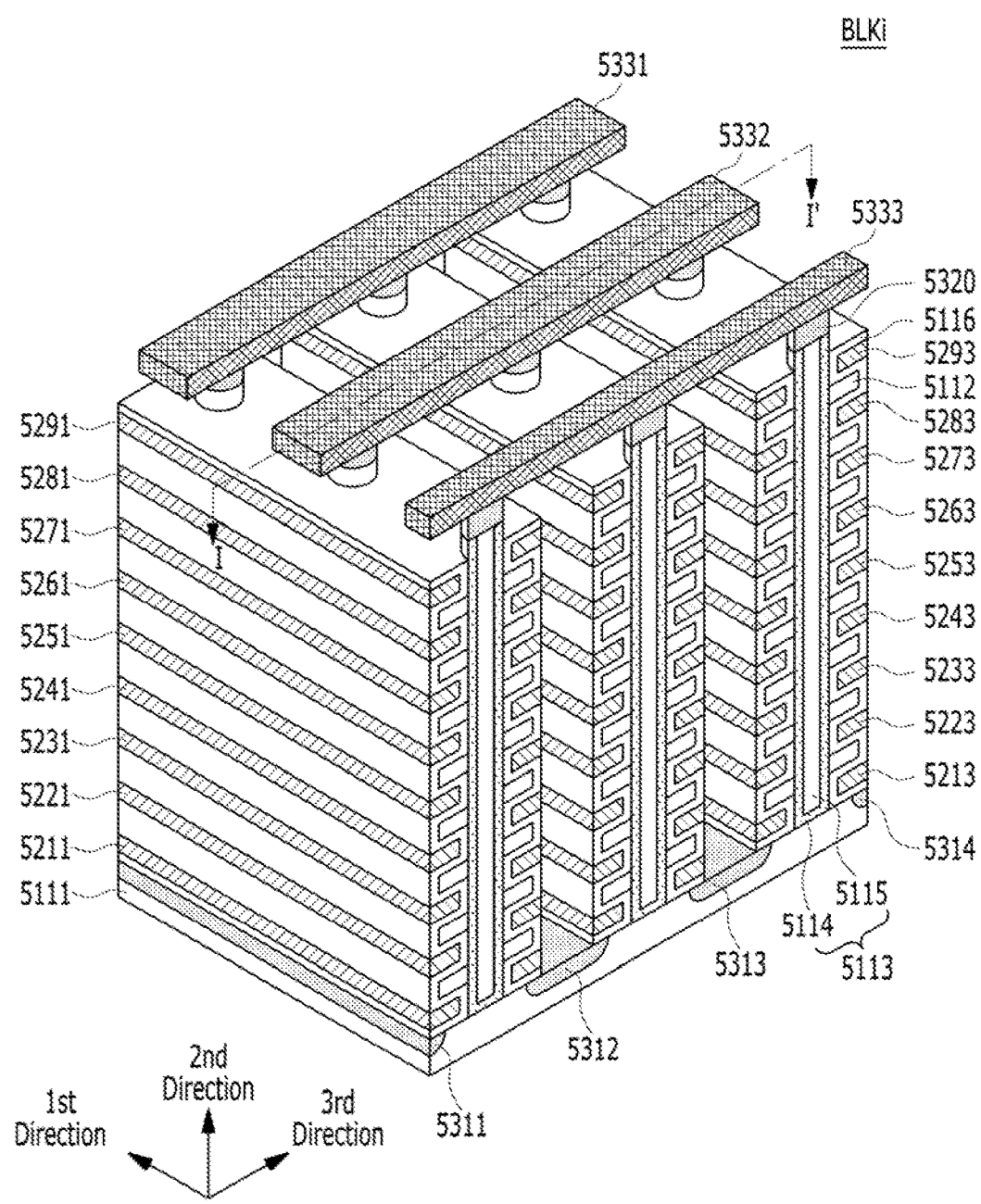
Figure 6:
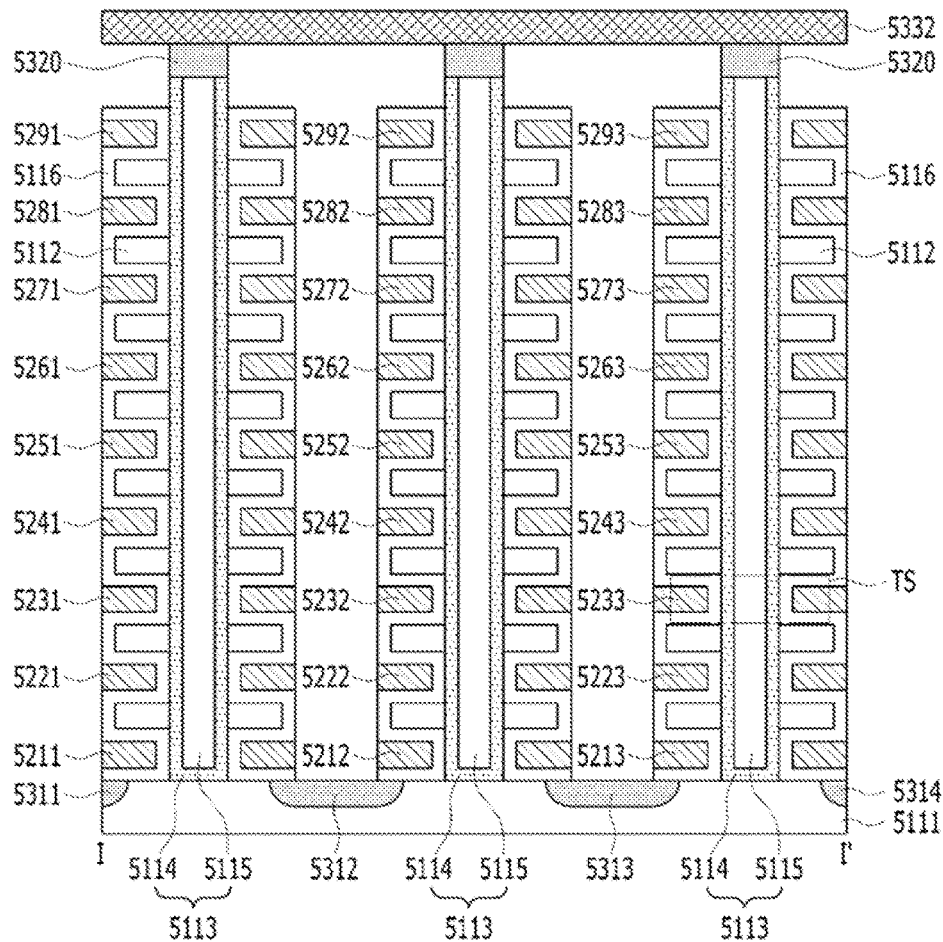

FIG. 5 is a perspective view of a certain memory block of the plural memory blocks BLK0 to BLKN−1 shown in FIG. 4. FIG. 6 is a cross-sectional view taken along a line I-I' of the memory block BLKi shown in FIG. 5.

Referring to FIGS. 5 and 6, the certain memory block BLKi among the plurality of memory blocks of the memory device 150 may include a structure which extends in the first to third directions.

A substrate 5111 may be provided. The substrate 5111 may include a silicon material doped with a first type impurity. For example, the substrate 5111 may include a silicon material doped with a p-type impurity or may be a p-type well, for example, a pocket p-well, and include an n-type well which surrounds the p-type well. While it is assumed in the embodiment for the sake of convenience in explanation that the substrate 5111 is p-type silicon, it is to be noted that the substrate 5111 is not limited to being p-type silicon.

A plurality of doping regions 5311 to 5314 which extend in the first direction may be provided over the substrate 5111. For example, the plurality of doping regions 5311 to 5314 may contain a second type of impurity that is different from the substrate 5111. For example, the plurality of doping regions 5311 to 5314 may be doped with an n-type impurity. While it is assumed in the embodiment for the sake of convenience in explanation that first to fourth doping regions 5311 to 5314 are n-type, it is to be noted that the first to fourth doping regions 5311 to 5314 are not limited to the n-type.

In the region over the substrate 5111 between the first and second doping regions 5311 and 5312, a plurality of dielectric materials 5112 which extend in the first direction may be sequentially provided in the second direction. For example, the plurality of dielectric materials 5112 and the substrate 5111 may be separated from one another by a predetermined distance in the second direction. For example, the plurality of dielectric materials 5112 may be separated from one another by a predetermined distance in the second direction. For example, the dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. For example, the plurality of pillars 5113 may respectively pass through the dielectric materials 5112 and may be electrically coupled with the substrate 5111. For example, each pillar 5113 may be configured by a plurality of materials. For example, a surface layer 5114 of each pillar 5113 may include a silicon material doped with the first type of impurity. For example, the surface layer 5114 of each pillar 5113 may include a silicon material doped with the same type of impurity as the substrate 5111. While it is assumed in the embodiment for the sake of convenience in explanation that the surface layer 5114 of each pillar 5113 includes p-type silicon, it is to be noted that the surface layer 5114 of each pillar 5113 is not limited to p-type silicon.

An inner layer 5115 of each pillar 5113 may be formed of a dielectric material. For example, the inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. For example, the thickness of the dielectric layer 5116 may be smaller than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. For example, the conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of a certain dielectric material of the dielectric materials 5112 and (ii) the dielectric layer 5116 disposed over the bottom surface of another dielectric material of the dielectric materials 5112, which is disposed over the certain dielectric material 5112. For example, the plurality of conductive materials 5221 to 5281 which extend in the first direction may be provided between the dielectric materials 5112. The conductive material 5291 which extends in the first direction may be provided over the uppermost dielectric material 5112. For example, the conductive materials 5211 to 5291 which extend in the first direction may be a metallic material. For example, the conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as the structures between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. For example, the drains 5320 may be silicon materials doped with second type impurities. For example, the drains 5320 may be silicon materials doped with n-type impurities. While it is assumed for the sake of convenience that the drains 5320 include n-type silicon, it is to be noted that the drains 5320 are not limited to n-type silicon. For example, the width of each drain 5320 may be larger than the width of each corresponding pillar 5113. For example, each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. For example, the drains 5320 and the conductive materials 5331 to 5333 which extend in the third direction may be electrically coupled with each other through contact plugs. For example, the conductive materials 5331 to 5333 which extend in the third direction may be a metallic material. For example, the conductive materials 5331 to 5333 which extend in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. For example, the respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
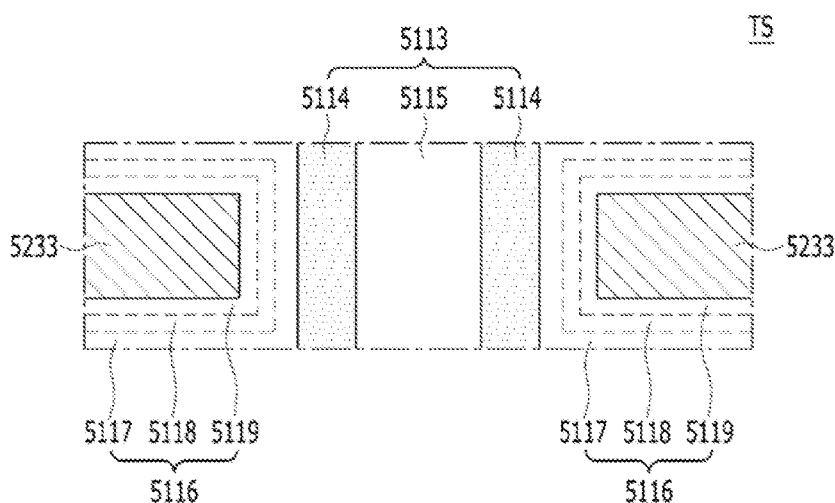

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. For example, the second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. For example, the third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience in explanation, the surface layer 5114 of p-type silicon in each of the pillars 5113 will be referred to as a body in the second direction.

The memory block BLKi may include the plurality of pillars 5113. Namely, the memory block BLKI may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a source select transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, for example, at least one source select line SSL and at least one ground select line GSL.

The conductive materials 5331 to 5333 which extend in the third direction may be electrically coupled to one end of the NAND strings NS. For example, the conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi includes a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to the fact that 3 NAND strings NS are electrically coupled to one bit line BL. For example, in the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to the fact that 3 NAND strings NS are electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
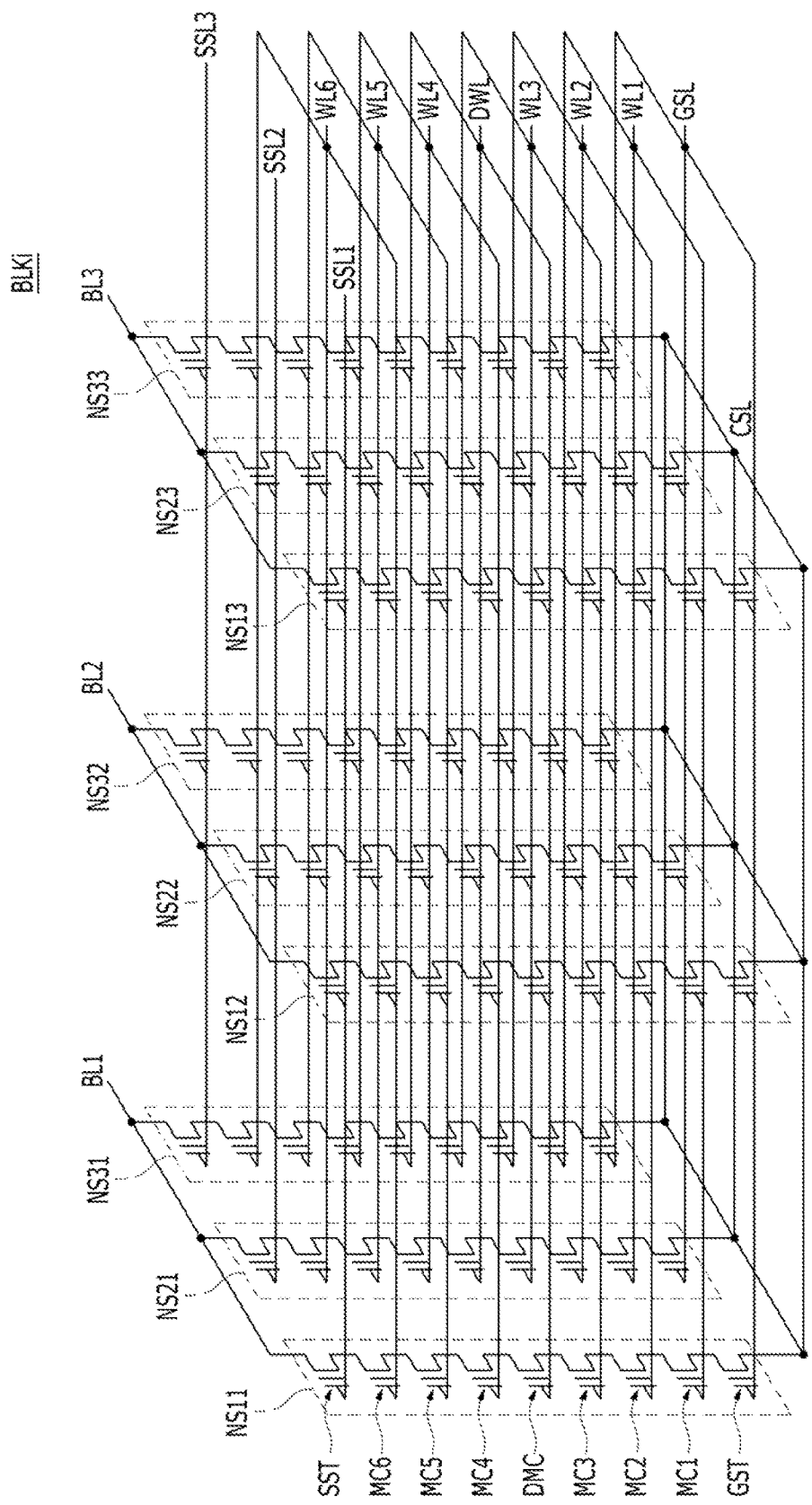

FIG. 8 is an equivalent circuit diagram illustrating the memory block BLKi having a first structure described with reference to FIGS. 5 to 7.

Referring to FIG. 8, in the certain block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In the embodiment, for the sake of convenience in explanation, it will be described as an example that NAND strings NS may be defined by the unit of row and column and NAND strings NS which are electrically coupled in common to one bit line may form one column. For example, the NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. For example, the NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. For example, in each NAND string NS, the height of a memory cell MC1 adjacent to the ground select transistor GST is a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST is 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled in common with one another. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled with one another.

For example, the word lines WL or the dummy word lines DWL located at the same level or height or layer may be electrically coupled in common with one another at layers where the conductive materials 5211 to 5291, 5212 to 5292 and 5213 to 5293 which extend in the first direction are provided. For example, the conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled in common with one another. In other words, the ground select transistors GST of the NAND strings NS in the same row may share the ground select line GSL. Further, the ground select transistors GST of the NAND strings NS in different rows may share the ground select line GSL. That is, the NAND strings NS 11 to NS13, NS21 to NS23 and NS31 to NS33 may be electrically coupled in common to the ground select line GSL.

The common source line CSL may be electrically coupled in common to the NAND strings NS. For example, over the active regions over the substrate 5111, the first to fourth doping regions 5311 to 5314 may be electrically coupled with one another. For example, the first to fourth doping regions 5311 to 5314 may be electrically coupled to an upper layer through contacts and, at the upper layer, the first to fourth doping regions 5311 to 5314 may be electrically coupled in common with one another.

Namely, as shown in FIG. 8, the word lines WL of the same height or level may be electrically coupled in common with one another. Accordingly, when a certain word line WL at a specific height is selected, all NAND strings NS which are electrically coupled to the certain word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC is provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST, may be referred to as a lower memory cell group, and memory cells, for example, MC4 to MC6, adjacent to the source select transistor SST, may be referred to as an upper memory cell group.

Hereinbelow, detailed descriptions will be made with reference to FIGS. 9 to 11, for when the memory device in the memory system in accordance with the embodiment is implemented with a three-dimensional (3D) nonvolatile memory device of a structure different from the first structure.

Figure 9:
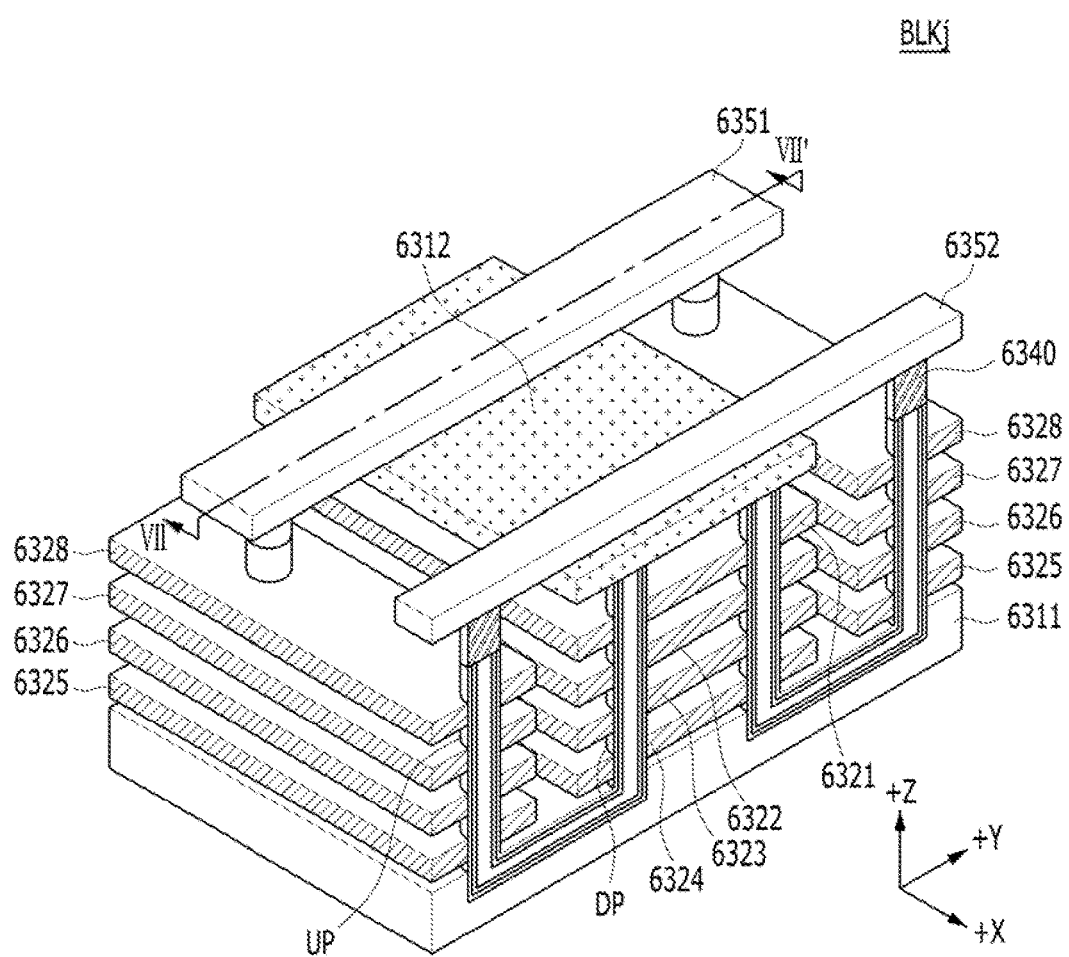
Figure 10:
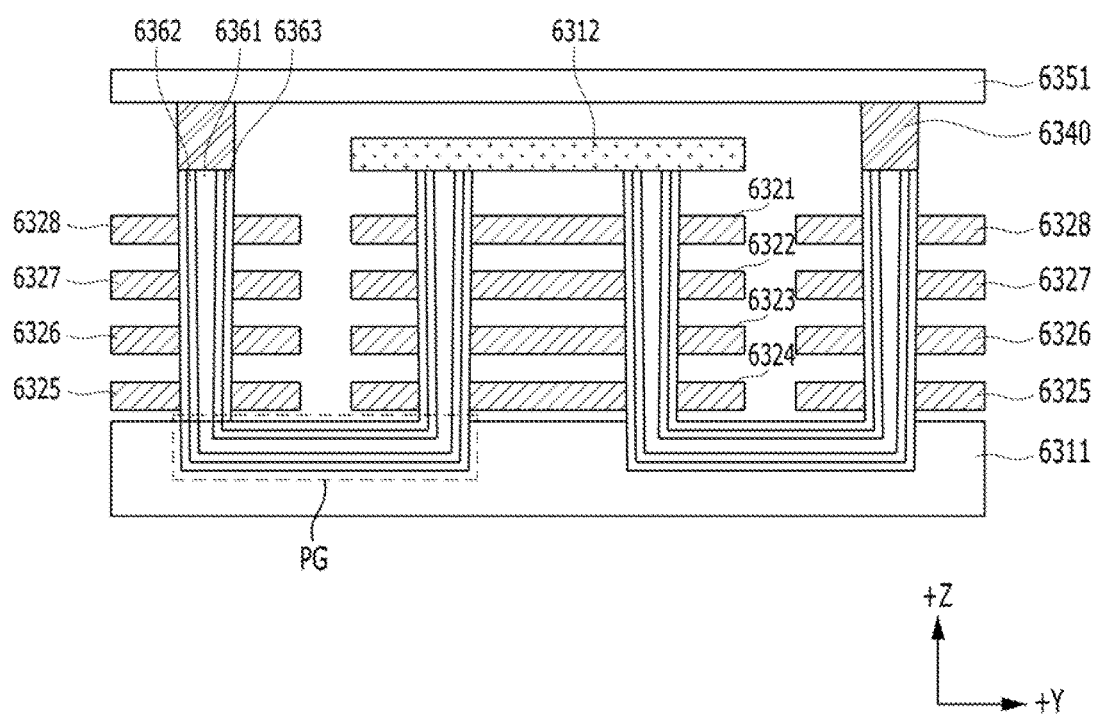

FIG. 9 is a perspective view schematically illustrating structures for when the memory device in accordance with the embodiment is implemented with a three-dimensional (3D) nonvolatile memory device of a second structure that is different from the first structure described above with reference to FIGS. 5 to 8 and showing a certain memory block BLKj having the second structure in the plurality of memory blocks of FIG. 4, and FIG. 10 is a cross-sectional view illustrating the certain memory block BLKj taken along the line VII-VII' of FIG. 9.

Referring to FIGS. 9 and 10, the certain memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience in explanation that the substrate 6311 is p-type silicon, it is to be noted that the substrate 6311 is not limited to p-type silicon.

First to fourth conductive materials 6321 to 6324 which extend in the x-axis direction and the y-axis direction are provided over the substrate 6311. The first to fourth conductive materials 6321 to 6324 are to be separated by a predetermined distance in the z-axis direction.

Fifth to eighth conductive materials 6325 to 6328 which extend in the x-axis direction and the y-axis direction are provided over the substrate 6311. The fifth to eighth conductive materials 6325 to 6328 are provided to be separated by the predetermined distance in the z-axis direction. The fifth to eighth conductive materials 6325 to 6328 are provided to be separated from the first to fourth conductive materials 6321 to 6324 in the y-axis direction.

A plurality of lower pillars DP which pass through the first to fourth conductive materials 6321 to 6324 are provided. Each lower pillar DP extends in the z-axis direction. Also, a plurality of upper pillars UP which pass through the fifth to eighth conductive materials 6325 to 6328 are provided. Each upper pillar UP extends in the z-axis direction.

Each of the lower pillars DP and the upper pillars UP includes an internal material 6361, an intermediate layer 6362, and a surface layer 6363. The intermediate layer 6362 serves as a channel of the cell transistor. The surface layer 6363 includes a blocking dielectric layer, a charge storing layer and a tunneling dielectric layer.

The lower pillar DP and the upper pillar UP are electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction is provided over the lower pillars DP. For example, the doping material 6312 of the second type may include an n-type silicon material. The doping material 6312 of the second type serves as a common source line CSL.

Drains 6340 are provided over the upper pillars UP. For example, the drains 6340 may include an n-type silicon material. First and second upper conductive materials 6351 and 6352 which extend in the y-axis direction are provided over the drains 6340.

The first and second upper conductive materials 6351 and 6352 are separated in the x-axis direction. For example, the first and second upper conductive materials 6351 and 6352 may be formed of a metal. For instance, the first and second upper conductive materials 6351 and 6352 and the drains 6340 may be electrically coupled with each other through contact plugs. The first and second upper conductive materials 6351 and 6352 respectively serve as first and second bit lines BL1 and BL2.

The first conductive material 6321 serves as a source select line SSL, the second conductive material 6322 serves as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 serves as a second dummy word line DWL2, and the eighth conductive material 6328 serves as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string are electrically coupled through the pipe gate PG. One end of the lower string is electrically coupled to the doping material 6312 of the second type which serves as the common source line CSL. One end of the upper string is electrically coupled to a corresponding bit line through the drain 6340. One lower string and one upper string form one cell string which is electrically coupled between the doping material 6312 of the second type, serving as the common source line CSL, and a corresponding one of the upper conductive material layers 6351 and 6352, serving as the bit line BL.

That is, the lower string includes a source select transistor SST, the first dummy memory cell DMC1, and the first and second main memory cells MMC1 and MMC2. The upper string includes the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
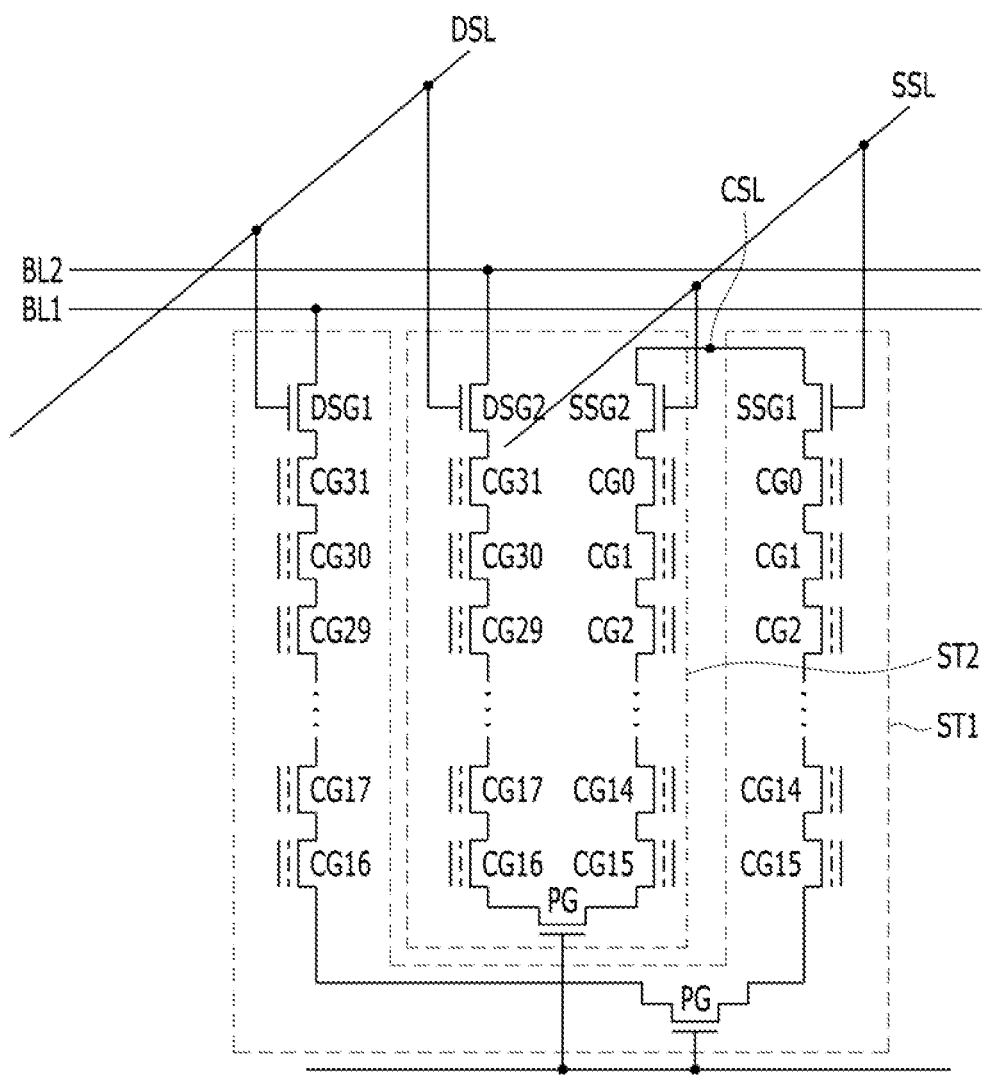

FIG. 11 is a circuit diagram illustrating the equivalent circuit of the memory block BLKj having the second structure as described above with reference to FIGS. 9 and 10. For the sake of convenience in explanation, only a first string and a second string, which form a pair in the certain memory block BLKj realized in the second structure, are shown.

Referring to FIG. 11, in the certain memory block BLKj having the second structure, among the plurality of blocks of the memory device 150, as described above with reference to FIGS. 9 and 10, cell strings, each of which is implemented with one upper string and one lower string are electrically coupled through the pipe gate PG, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 are electrically coupled to the same drain select line DSL and the same source select line SSL. The first string ST1 is electrically coupled to a first bit line BL1, and the second string ST2 is electrically coupled to a second bit line BL2.

While it is described in FIG. 11 for the sake of convenience in explanation that the first string ST1 and the second string ST2 are electrically coupled to the same drain select line DSL and the same source select line SSL, it may be envisaged that the first string ST1 and the second string ST2 are electrically coupled to the same source select line SSL and the same bit line BL, the first string ST1 is electrically coupled to a first drain select line DSL1 and the second string ST2 is electrically coupled a second drain select line DSL2, or it may be envisaged that the first string ST1 and the second string ST2 are electrically coupled to the same drain select line DSL and the same bit line BL, the first string ST1 is electrically coupled to a first source select line SSL1 and the second string ST2 is electrically coupled a second source select line SSL2. Hereinbelow, detailed descriptions will be made with reference to FIGS. 12 and 13 describing data processing, that is, data read and write operations, with respect to a memory device in the memory system in accordance with an embodiment.

Figure 12:
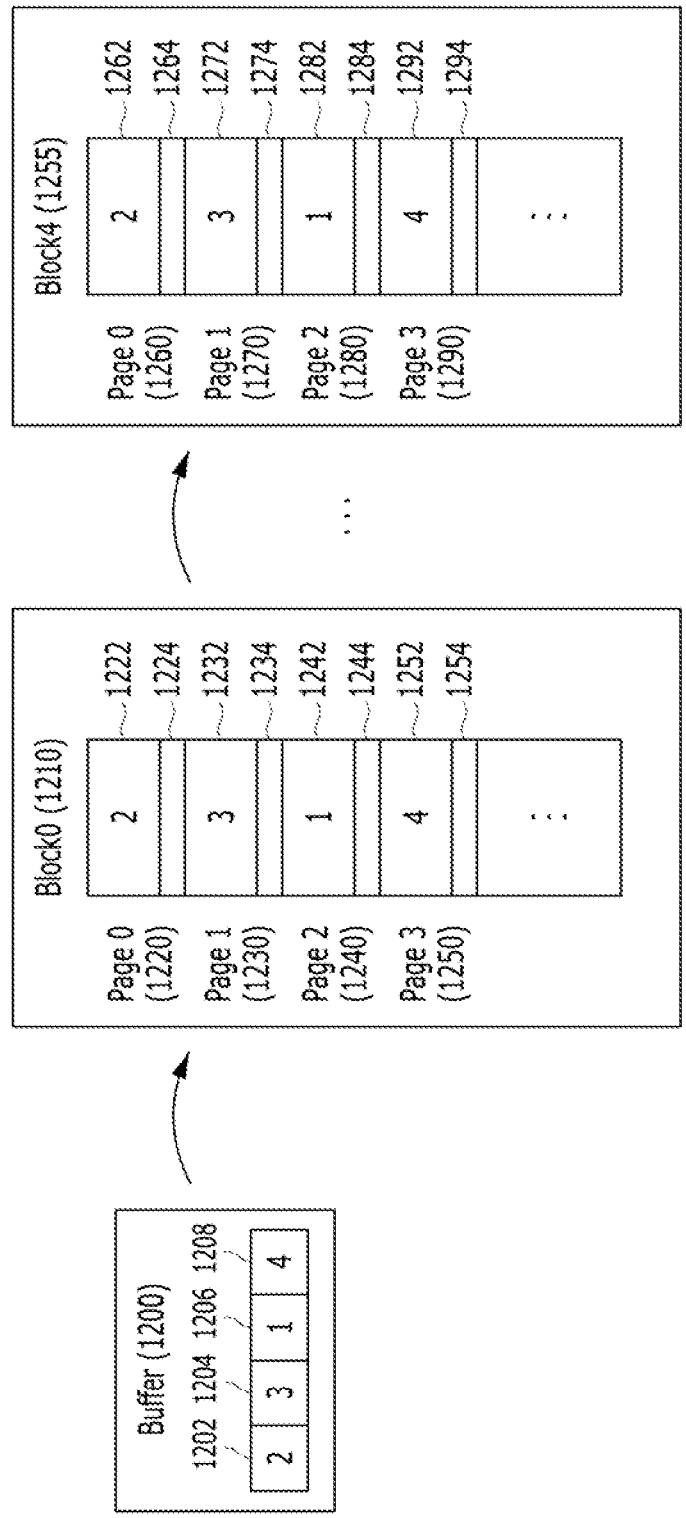
FIG. 12 is a schematic diagram illustrating data processing operation in accordance with an embodiment.

FIG. 12 is a schematic diagram illustrating a data processing operation with respect to a memory device in the memory system in accordance with an embodiment. In an embodiment, in the memory system 110 shown in FIG. 1, after storing write data/read data corresponding to the write command/read command received from the host 102 in the buffer/cache included in the memory 144 of the controller 130, for example, a write buffer/cache or a read buffer/cache, in particular, a write buffer/cache, the data stored in the buffer/cache are programmed in a certain memory block selected among the plurality of memory blocks included in the memory device 150 and the data programmed in the certain memory block are copied/backed up in another memory block.

In an embodiment, the controller 130 performs the data processing operation in the memory system. However, in another embodiment, the processor 134 included in the controller 130 may perform data processing. In an embodiment, write data/read data corresponding to the write command/read command received from the host 102 are stored in the buffer/cache included in the memory 144 of the controller 130, in particular, a write buffer/cache. However, in another embodiment, the data may be stored in the plurality of page buffers 322, 324 and 326 included in the memory device 300 described above with reference to FIG. 3, a plurality of latches, or an external memory device.

In an embodiment, to perform garbage collection (GC) with a certain memory block programmed with data from the buffer/cache being a victim block, the data programmed in valid pages of the certain memory block referred to as victim block, are copied/backed up in another memory block referred to as a GC block. In another embodiment, data may be programmed by copying/backing up data among the plurality of memory blocks included in the memory device 150.

Referring to FIGS. 1 and 12, after storing write data/read data corresponding to the write command/read command received from the host 102, for example, write data, in a buffer (Buffer) 1200 included in the memory 144 of the controller 130, the controller 130 programs the data stored in the buffer 1200 in a certain memory block of the memory device 150. For example, the controller 130 programs the data stored in the buffer 1200 in a zeroth block (Block0) 1210 and copies/backs up that is, programs the data programmed in the zeroth block 1210 (victim block) into another certain block (GC block), for example, a fourth block (Block4) 1255.

The controller 130 stores write data corresponding to the write command from the host 102, for example, the data of a logic page number 2 (hereinafter, referred to as "data 2") 1202, the data of a logic page number 3 (hereinafter, referred to as "data 3") 1204, the data of a logic page number 1 (hereinafter, referred to as "data 1") 1206 and the data of a logic page number 4 (hereinafter, referred to as "data 4") 1208, in the buffer 1200.

The controller 130 programs the data 1202, 1204, 1206 and 1208 stored in the buffer 1200 in a certain memory block corresponding to MAP information among a plurality of memory blocks, for example, the zeroth block 1210. That is, the controller 130 programs the data 2 1202, the data 3 1204, the data 1 1206 and the data 4 1218 stored in the buffer 1200 in the pages included in the zeroth block 1210. In particular, the controller 130 programs the data 2 1202 in a zeroth page (Page0) 1220 of the zeroth block 1210, programs the data 3 1204 in a first page (Page1) 1230 of the zeroth block 1210, programs the data 1 1206 in a second page (Page2) 1240 of the zeroth block 1210, and programs the data 4 1208 in a third page (Page3) 1250 of the zeroth block 1210.

After programming the data 2 1202 stored in the buffer 1200 in a data region 1222 of the zeroth page 1220, the controller 130 records position information of data which will be programmed in the first page 1230, that is, the data 3 1204. That is, the position information of the data 3 1204 is stored in a spare region 1224 of the zeroth page 1220. The position information of the data 3 1204 may be stored as a logical block address (LBA). Hence, the controller 130 programs the data 2 1202 stored in the buffer 1200 in the data region 1222 of the zeroth page 1220 and records the position information of the data 3 1204 stored in the buffer 1200 in the spare region 1224 of the zeroth page 1220. Accordingly, the program for the zeroth page 1220 of the zeroth block 1210 completes. That is, the program of the zeroth page 1220 of the zeroth block 1210 succeeds.

After programming the data 3 1204 stored in the buffer 1200 in a data region 1232 of the first page 1230, the controller 130 records the position information of data which will be programmed in the second page 1240 next to the first page 1230, that is, the data 1 1206 in a spare region 1234 of the first page 1230. In other words, the position information of the data 1 1206 is stored in a spare region 1234 of the first page 1230. The position information of the data 1 1206 may be stored as an LBA. Namely, the controller 130 programs the data 3 1204 stored in the buffer 1200 in the data region 1232 of the first page 1230 and records the position information of the data 1 1206 stored in the buffer 1200 in the spare region 1234 of the first page 1230. Accordingly, the program for the first page 1230 of the zeroth block 1210 is completed. That is, the program of the first page 1230 of the zeroth block 1210 has succeeded.

When the first page 1230 of the zeroth block 1210 has not been normally completely programmed due to occurrence of a sudden power-off (SPO) and the like while performing the program for the first page 1230 of the zeroth block 1210, the controller 130 checks the position information of the data 3 1204 recorded in the zeroth page 1220 of the zeroth block 1210, which is the previous page of the program-failed first page 1230, and again performs the program of the data 3 1204 in the data region 1232 of the first page 1230. That is, when the operation of programming the data 3 1204 in the data region 1232 of the first page 1230 is unsuccessful or failed, the controller 130 retries to program the data 3 1204 in the first page 1230 of the zeroth block 1210 using the position information of the data 3 1204 recorded in the zeroth page 1220 of the zeroth block 1210.

Therefore, for the program-failed first page 1230, after precisely checking the position of the data 3 1204 stored in the buffer 1200 and by using the position information of the data 3 1204 recorded in the previous zeroth page 1220, the controller 130 retries to program the data 3 1204 in the first page 1230 of the zeroth block 1210. That is, the controller 130 retries to program the data 3 1204 in the data region 1232 of the first page 1230 and records the position information of the data 1 1206 stored in the buffer 1200 in the spare region 1234 of the first page 1230, thereby normally completing the program for the first page 1230 of the zeroth block 1210.

After programming the data 1 1206 stored in the buffer 1200 in a data region 1242 of the second page 1240, the controller 130 records the position information of the next data which will be programmed in the third page 1250 next to the second page 1240, that is, the data 4 1208. Information is recorded on a position where the data 4 1208 is stored in the buffer 1200, for example, an LBA as an address, in a spare region 1244 of the second page 1240. Namely, the controller 130 programs the data 1 1206 stored in the buffer 1200 in the data region 1242 of the second page 1240 and records the position information of the data 4 1208 stored in the buffer 1200 in the spare region 1244 of the second page 1240. Accordingly, the program for the second page 1240 of the zeroth block 1210 is completed, that is, the program of the second page 1240 of the zeroth block 1210 has succeeded.

When the second page 1240 of the zeroth block 1210 has not been normally completely programmed, that is, when the programming operation fails, as described above in the case of the program fail for the previous first page 1230, the controller 130 checks the position information of the data 1 1206 recorded in the first page 1230 of the zeroth block 1210, which is the previous page of the program-failed second page 1240, and again performs the program of the data 1 1206 in the data region 1242 of the second page 1240, that is, performs the program for the second page 1240 of the zeroth block 1210. In addition, the controller 130 records the position information of the data 4 1208 stored in the buffer 1200 in the spare region 1244 of the second page 1240, thereby normally completing the program for the second page 1240 of the zeroth block 1210.

After programming the data 4 1208 stored in the buffer 1200 in a data region 1252 of the third page 1250, the controller 130 records the position information of the next data, which will be programmed in a fourth page next to the third page 1250, in a spare region 1254 of the third page 1250. When data to be programmed in the fourth page as the next page of the third page 1250 does not exist in the buffer 1200, the controller 130 records dummy data or null data in the spare region 1254 of the third page 1250, such that the program for the third page 1250 of the zeroth block 1210 may be completed. Namely, the controller 130 programs the data 4 1208 stored in the buffer 1200 in the data region 1252 of the third page 1250. Since the data 4 1208 is the last data stored in the buffer 1200, data to be programmed in the fourth page does not exist in the buffer 1200. The controller 130 records dummy data or null data in the spare region 1254 of the third page 1250. Accordingly, the program for the third page 1250 of the zeroth block 1210 is completed, that is, the program of the third page 1250 of the zeroth block 1210 has succeeded.

When the third page 1250 of the zeroth block 1210 has not been normally completely programmed, that is, when the program has not succeeded but failed, as described above in the case of the program fall for the previous first page 1230, the controller 130 checks the position information of the data 4 1208 recorded in the second page 1240 of the zeroth block 1210, which is the previous page of the program-failed third page 1250, and again performs the program of the data 4 1208 in the data region 1252 of the third page 1250, that is, performs the program for the third page 1250 of the zeroth block 1210. In addition, the controller 130 records dummy data or null data in the spare region 1254 of the third page 1250, thereby normally completing the program for the third page 1250 of the zeroth block 1210.

Hereinbelow, detailed descriptions will be made for the case of programming data by copying/backing up data among the plurality of memory blocks included in the memory device 150, that is, for a data program operation of copying/backing up the data programmed in valid pages of a certain memory block (a victim block) in another certain memory block (a GC block).

As described above, after programming the data 2 1202, the data 3 1204, the data 1 1206, and the data 4 1208 in the pages 1220, 1230, 1240 and 1250 included in the zeroth block 1210, respectively, the controller 130 copies/backs up that is, programs the data programmed in the pages 1220, 1230, 1240 and 1250 of the zeroth block 1210. The data 2 programmed in the zeroth page 1220 of the zeroth block 1210, the data 3 programmed in the first page 1230 of the zeroth block 1210, the data 1 programmed in the second page 1240 of the zeroth block 1210, and the data 4 programmed in the third page 1250 of the zeroth block 1210 are copied in pages 1260, 1270, 1280 and 1290, respectively, included in the fourth block 1255.

The data 2 programmed in the zeroth page 1220 of the zeroth block 1210 is programmed in the zeroth page (Page0) 1260 of the fourth block 1255. The data 3 programmed in the first page 1230 of the zeroth block 1210 is programmed in the first page (Page1) 1270 of the fourth block 1255. The data 1 programmed in the second page 1240 of the zeroth block 1210 is programmed in the second page (Page2) 1280 of the fourth block 1255. The data 4 programmed in the third page 1250 of the zeroth block 1210 is programmed in the third page (Page3) 1290 of the fourth block 1255.

Furthermore, after programming, that is copying, the data 2 programmed in the zeroth page 1220 of the zeroth block 1210 in a data region 1262 of the zeroth page 1260 of the fourth block 1255, the controller 130 records the position information of data to be programmed in the first page 1270 next to the zeroth page 1260, that is, the data 3 to be programmed (copied) in the first page 1270 of the fourth block 1255. In other words, information is recorded on a position where the data 3 is stored in the first page 1230 of the zeroth block 1210, for example, a logical block address (LBA) as an address, or information that indicates the data region 1232 of the first page 1230 of the zeroth block 1210, in a spare region 1264 of the zeroth page 1260. Namely, the controller 130 programs the data 2 programmed in the zeroth page 1220 of the zeroth block 1210 in the data region 1262 of the zeroth page 1260 of the fourth block 1255 and records the position information of the data 3 programmed in the first page 1230 of the zeroth block 1210 in the spare region 1264 of the zeroth page 1260 of the fourth block 1255. Accordingly, the program for the zeroth page 1260 of the fourth block 1255 is completed, that is, the program of the zeroth page 1260 of the fourth block 1255 has succeeded.

After programming the data 3 programmed in the first page 1230 of the zeroth block 1210 in a data region 1272 of the first page 1270 of the fourth block 1255, the controller 130 records the position information of data to be programmed in the second page 1280 as the next page of the first page 1270, that is, the data 1 to be programmed in the second page 1280 of the fourth block 1255. In other words, information is recorded on a position where the data 1 is stored in the second page 1240 of the zeroth block 1210, for example, an LBA as an address, or information that indicates the data region 1242 of the second page 1240 of the zeroth block 1210, in a spare region 1274 of the first page 1270. Namely, the controller 130 programs that is, copies the data 3 programmed in the first page 1230 of the zeroth block 1210 in the data region 1272 of the first page 1270 of the fourth block 1255 and records the position information of the data 1 programmed in the second page 1240 of the zeroth block 1210 in the spare region 1274 of the first page 1270 of the fourth block 1255. Accordingly, the program for the first page 1270 of the fourth block 1255 is completed, that is, the program of the first page 1270 of the fourth block 1255 has succeeded.

When the first page 1270 of the fourth block 1255 has not been normally completely programmed due to occurrence of a sudden power-off (SPO) and the like while performing the program for the first page 1270 of the fourth block 1255, that is, when the program has not succeeded but failed, the controller 130 checks the position information of the data 3 recorded in the zeroth page 1260 of the fourth block 1255 as the previous page of the program-failed first page 1270, and again performs the program of the data 3 in the data region 1272 of the first page 1270, that is, performs the program for the first page 1270 of the fourth block 1255.

In this way, the program-failed first page 1270 is cured or corrected. After precisely checking the position of the data 3 programmed in the first page 1230 of the zeroth block 1210, by using the position information of the data 3 recorded in the zeroth page 1260 as the previous page, the controller 130 programs the data 3 programmed in the first page 1230 of the zeroth block 1210 in the first page 1270 of the fourth block 1255. More specifically, the data 3 is programmed that is, copied, in the data region 1272 of the first page 1270 of the fourth block 1255. The controller 130 records the position information of the data 1 programmed in the second page 1240 of the zeroth block 1210 in the spare region 1274 of the first page 1270 of the fourth block 1255, thereby normally completing the program for the first page 1270 of the fourth block 1255.

After programming the data 1 programmed in the second page 1240 of the zeroth block 1210 in a data region 1282 of the second page 1280 of the fourth block 1255, the controller 130 records the position information of data to be programmed in the third page 1290 as the next page of the second page 1280, that is, the data 4 to be programmed in the third page 1290 of the fourth block 1255. In other words, information is recorded on a position where the data 4 is stored in the third page 1250 of the zeroth block 1210, for example, an LBA as an address, or information that indicates the data region 1252 of the third page 1250 of the zeroth block 1210, in a spare region 1284 of the second page 1280. Namely, the controller 130 programs the data 1 programmed in the second page 1240 of the zeroth block 1210, in the data region 1282 of the second page 1280, and records the position information of the data 4 programmed in the third page 1250 of the zeroth block 1210, in the spare region 1284 of the second page 1280. Accordingly, the program for the second page 1280 of the fourth block 1255 is completed, that is, the program of the second page 1280 of the fourth block 1255 has succeeded.

When the second page 1280 of the fourth block 1255 is not normally completely programmed that is, when the program has not succeeded but failed, as described above in the case of the program fall for the previous first page 1270, the controller 130 checks the position information of the data 1 recorded in the first page 1270 of the fourth block 1255 as the previous page of the program-failed second page 1280, and again performs the program of the data 1 in the data region 1282 of the second page 1280, that is, performs the program for the second page 1280 of the fourth block 1255. Furthermore, the controller 130 records the position information of the data 4 programmed in the third page 1250 of the zeroth block 1210, in the spare region 1284 of the second page 1280, thereby normally completing the program for the second page 1280 of the fourth block 1255.

After programming the data 4 programmed in the third page 1250 of the zeroth block 1210 in a data region 1292 of the third page 1290 of the fourth block 1255, the controller 130 records the position information of data to be programmed in a fourth page as the next page of the third page 1290 in a spare region 1294 of the third page 1290. When data programmed in a fourth page as the next page of the third page 1250 of the zeroth block 1210 does not exist, that is, when data to be programmed in the fourth page as the next page of the third page 1290 of the fourth block 1255 does not exist, the controller 130 records dummy data or null data in the spare region 1294 of the third page 1290, such that the program for the third page 1290 of the fourth block 1255 may be completed. Namely, the controller 130 programs the data 4 programmed in the third page 1250 of the zeroth block 1210 in the data region 1292 of the third page 1290. Then, since data programmed in the fourth page of the zeroth block 1210 does not exist, the controller 130 records dummy data or null data, in the spare region 1294 of the third page 1290. Accordingly, the program for the third page 1290 of the fourth block 1255 is completed, that is, the program of the third page 1290 of the fourth block 1255 has succeeded.

When the third page 1290 of the fourth block 1255 is not been normally completely programmed that is, when the program has not succeeded but failed, as described above in the case of the program fail for the previous first page 1270, the controller 130 checks the position information of the data 4 recorded in the second page 1280 of the fourth block 1255 as the previous page of the program-failed third page 1290 and again performs the program of the data 4 in the data region 1292 of the third page 1290, that is, performs the program for the third page 1290 of the fourth block 1255. Furthermore, the controller 130 records dummy data or null data in the spare region 1294 of the third page 1290, thereby normally completing the program for the third page 1290 of the fourth block 1255. Hereinbelow, operations for processing data in the memory system in accordance with an embodiment will be described in detail with reference to FIG. 13.

Figure 13:
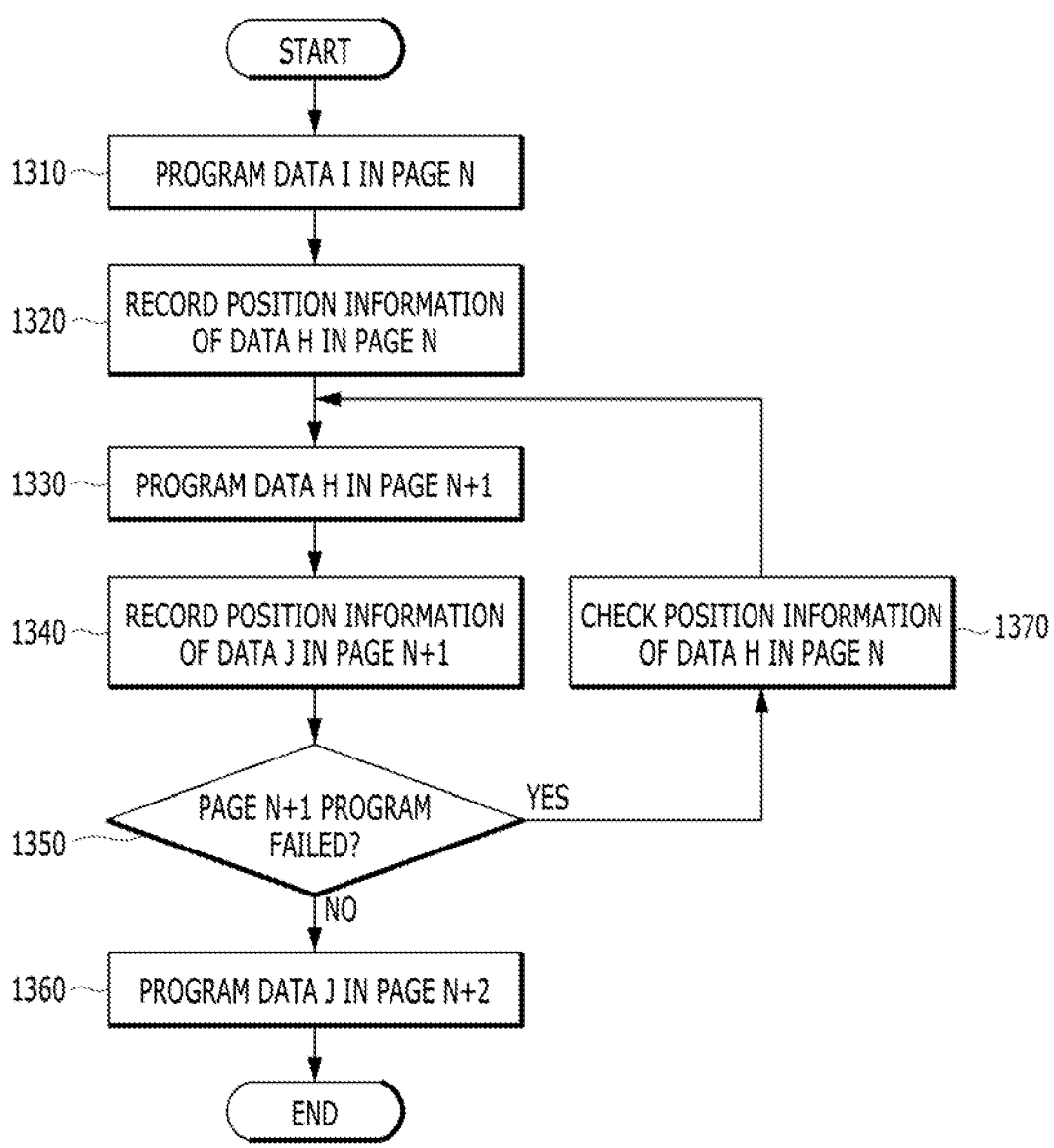
FIG. 13 is a schematic flow chart illustrating an operation process for processing data in a memory system in accordance with an embodiment.

FIG. 13 is a representation of an example of a schematic flow chart to assist in the description of an operation process for processing data in the memory system in accordance with an embodiment.

Referring to FIG. 13, at step 1310, a memory system programs the read data/write data requested from a host in a certain memory block selected among a plurality of memory blocks. For example, the memory system programs data i in a page n of a first memory block selected among a plurality of memory blocks. The data i is programmed in a data region in the page n of the first memory block.

At step 1320, the position information of the next data h, which will be programmed in a page n+1 next to the page n of the first memory block, is recorded in the page n of the first memory block. For example, the position information of the data h may be the position information of a buffer in which the data h is stored or the position information of another memory block in which the data h is programmed, for example, a second memory block. The position information of the data h is recorded in a spare region in the page n of the first memory block.

Then, at step 1330, the data h is programmed in the page n+1 next to the page n of the first memory block. The data h is programmed in a data region in the page n+1 of the first memory block.

At step 1340, the position information of data j, which will be programmed in a page n+2 next to the page n+1 of the first memory block, is recorded in the page n+1 of the first memory block. For example, the position information of data j may be the position information of a buffer in which the data j is stored or the position information of another memory block in which the data j is programmed, for example, the second memory block. The position information of the data j is recorded in a spare region in the page n+1 of the first memory block.

At step 1350, it is determined whether the program for the page n+1 of the first memory block has been normally completed. That is, it is determined whether the programming operation in the page n+1 of the first memory block is successful. When it is determined at the step 1350 that the program for the page n+1 of the first memory block fails, at step 1370, the position information of the data h recorded in the spare region of the page n, which is the previous page of the page n+1 of the first memory block, is checked.

Then, at the step 1330, the data h is programmed again in the page n+1 by using the position information of the data h recorded in the spare region of the page n.

When it is determined at the step 1350 that the program for the page n+1 of the first memory block has been normally completed that is, the page n+1 of the first memory block is successfully programmed, at step 1360 data j is programmed in a page n+2 next to the page n+1 of the first memory block. The data j is programmed in a data region in the page n+2 of the first memory block. If there is no data to be programmed in a page n+3 next to the page n+2 of the first memory block, dummy data or null data is recorded in a spare region in the page n+2 of the first memory block.

Since data processing in a memory device for example, an operation of programming the data stored in a buffer/a cache in the pages of a memory block and an operation of programming or copying the data programmed in a certain memory block in another certain memory block, was described above in detail with reference to FIG. 12, detailed descriptions thereof will be omitted herein.

As is apparent from the above descriptions, the memory system and the operating method thereof according to the embodiments may quickly and stably process data from a memory device.

What is claimed is:

1. A memory system comprising:
 a memory device including a plurality of memory blocks, wherein each of the plurality of memory blocks includes a plurality of pages, wherein each of the plurality of pages includes a plurality of memory cells electrically coupled to a plurality of word lines, and wherein read data and write data requested from a host are stored in the plurality of memory cells; and
 a controller configured to (i) program first data corresponding to a write command/read command received from the host in a first page of a first memory block selected among the plurality of memory blocks (ii) record position information of second data in the first page, and (iii) program the second data in a second page next to the first page in the first memory block,
 wherein the controller programs the first data in a data region of the first page and records the position information of the second data in a spare region of the first page,
 wherein the controller records position information of third data in the second page and programs the third data in a third page next to the second page, and
 wherein, when the second data is not programmed successfully in the second page, the controller programs the second data in the second page using the position information of the second data recorded in the spare region of the first page.

2. The memory system according to claim 1, wherein, when the third data does not exist, the controller records dummy data or null data in a spare region of the second page.

3. The memory system according to claim 1, wherein, when the first data and the second data are data which are stored in a buffer included in the controller, the position information of the second data is an address of the second data which is stored in the buffer.

4. The memory system according to claim 1, wherein, when the first data and the second data are data which are programmed in the first memory block, the position information of the second data is an address of the second data which is programmed in the first memory block.

5. The memory system according to claim 4, wherein the position information of the second data includes information on the location where the second data is stored in the first memory block.

6. The memory system according to claim 1, wherein the position information of the second data is a logical block address (LBA) of the second data.

7. A method for operating a memory system includes a memory apparatus, comprising:
 selecting a first memory block among a plurality of memory blocks of the memory apparatus;
 selecting a first page among a plurality of pages included in the first memory block, wherein the first page includes a plurality of memory cells electrically coupled to a plurality of word lines;
 programming first data corresponding to a write command/read command received from a host in the first page of the first memory block;
 recording position information of second data in the first page of the first memory block; and
 programming the second data in a second page next to the first page in the first memory block,
 wherein the programming of the first data corresponding to the write command/read command received from the host in the first page includes programming the first data in a data region of the first page,
 wherein the recording of the position information of the second data includes recording the position information of the second data in a spare region of the first page, and
 wherein the programming in the second page further comprises:
 recording position information of third data in the second page, wherein the third data is programmed in a third page next to the second page;
 wherein the programming of the second data in the second page further comprises:
 checking the position information of the second data recorded in the spare region of the first page when the programming of the second data in the second page fails; and
 programming the second data in the second page by using the position information of the second data.

8. The method according to claim 7, wherein the recording of the position information of third data in the second page further comprises:
 recording dummy data or null data in a spare region of the second page when the third data which is programmed in the third page does not exist.

9. The method according to claim 7, wherein, when the first data and the second data are data which are stored in a buffer included in a controller, the position information of the second data is an address of the second data which is stored in the buffer.

10. The method according to claim 7, wherein, when the first data and the second data are data which are programmed in the first memory block, the position information of the second data is an address of the second data which is programmed in the first memory block.

11. The method according to claim 10, wherein the position information of the second data includes information on the location where the second data is stored in the second memory block.

12. The method according to claim 7, wherein the position information of the second data is a logical block address (LBA) of the second data.

13. A memory system comprising:
a memory block including N number of pages,
wherein $(M-1)^{th}$ page includes non-position information of $(M-1)^{th}$ data,
wherein $M^{th}$ page includes non-position information of $M^{th}$ data,
wherein the $(M-1)^{th}$ page further includes position information of the $M^{th}$ data,
wherein N is an integer, M is an integer, and M≤N,
wherein each of the N number of pages includes a data region and a spare region,
wherein a data region of the $(M-1)^{th}$ page stores the non-position information of the $(M-1)^{th}$ data,
wherein a spare region of the $(M-1)^{th}$ page stores the position information of the $M^{th}$ data, and
wherein a spare region of the $N^{th}$ page stores null data.

* * * * *